(12) United States Patent  
Kerai

(10) Patent No.: US 10,123,194 B2  
(45) Date of Patent: Nov. 6, 2018

(54) HANDLING BLUETOOTH LOW ENERGY MESSAGES OF RADIO TAGS FOR POSITION DETERMINATION

(71) Applicant: HERE GLOBAL B.V., Eindhoven (NL)

(72) Inventor: Kanji Kerai, London (GB)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/534,586

(22) PCT Filed: Dec. 9, 2014

(86) PCT No.: PCT/EP2014/076971  
§ 371 (c)(1),  
(2) Date: Jun. 9, 2017

(87) PCT Pub. No.: WO2016/091284  
PCT Pub. Date: Jun. 16, 2016

(65) Prior Publication Data  
US 2017/0347228 A1 Nov. 30, 2017

(51) Int. Cl.  
*H04W 4/00* (2018.01)  
*H04W 4/80* (2018.01)  
(Continued)

(52) U.S. Cl.  
CPC ............. *H04W 4/80* (2018.02); *G01S 5/0036* (2013.01); *G01S 5/0252* (2013.01); *H04W 84/12* (2013.01); *H04W 84/22* (2013.01)

(58) Field of Classification Search  
CPC ..... H04W 4/008; H04W 84/22; H04W 84/12; G01S 5/0252; G01S 5/0036; G01S 5/0294; G01S 5/02  
See application file for complete search history.

(56) References Cited

U.S. PATENT DOCUMENTS

2008/0167049 A1 7/2008 Karr et al.  
2013/0103200 A1 4/2013 Tucker et al.  
(Continued)

FOREIGN PATENT DOCUMENTS

EP 2 662 703 A1 11/2013  
EP 2 677 335 A1 12/2013

OTHER PUBLICATIONS

International Search Report and Written Opinion for International Application No. PCT/EP2014/076971 dated Sep. 9, 2015.

*Primary Examiner* — Thanh Le  
(74) *Attorney, Agent, or Firm* — Alston & Bird LLP

(57) ABSTRACT

A method comprises: a mobile tag receiving at least one first Bluetooth Low Energy message transmitted from each of at least two fixed tags, each first Bluetooth Low Energy message including at least an identifier corresponding to the respective fixed tag; the mobile tag measuring a radio parameter for each of the received first Bluetooth Low Energy messages; and the mobile tag transmitting a second Bluetooth Low Energy message including the identifiers of each of the fixed tags, the measured radio parameters associated with each of the received first Bluetooth Low Energy messages, and an identifier corresponding to the mobile tag, said second Bluetooth Low Energy message enabling the calculation of a position of the mobile tag by a server apparatus. A further method comprises: a Bluetooth receiver device receiving at least one second Bluetooth Low Energy message from a mobile tag; the Bluetooth receiver device decoding from the message identifiers of at least two fixed tags from which first Bluetooth Low Energy messages have been transmitted; the Bluetooth receiver device decoding from the message measured radio parameters associated with the first Bluetooth Low Energy messages; and the Bluetooth receiver device decoding from the message an identifier corresponding to the mobile tag; server apparatus (Continued)

retrieving position data corresponding to each of the fixed tags using their respective identifiers; and the server apparatus using the position data and the radio parameters included in the second Bluetooth Low Energy message to calculate a position of the mobile tag.

20 Claims, 11 Drawing Sheets

(51) Int. Cl.
    *G01S 5/00*         (2006.01)
    *G01S 5/02*         (2010.01)
    *H04W 84/12*       (2009.01)
    *H04W 84/22*       (2009.01)

(56) References Cited

U.S. PATENT DOCUMENTS

| | | | |
|---|---|---|---|
| 2013/0342402 A1* | 12/2013 | Pesonen | G01S 5/0294 342/451 |
| 2014/0370917 A1* | 12/2014 | Buchheim | H04W 4/008 455/456.1 |
| 2016/0187153 A1* | 6/2016 | Johnson | H04W 4/025 701/500 |

* cited by examiner

HANDLING BLUETOOTH LOW ENERGY MESSAGES OF RADIO TAGS FOR POSITION DETERMINATION

FIELD

The present disclosure relates to handling Bluetooth Low Energy messages.

BACKGROUND

Bluetooth Low Energy (BTLE) is a wireless communication technology published by the Bluetooth Special Interest Group (BT-SIG) standard as a component of Bluetooth Core Specification Version 4.0. BTLE is a lower power, lower complexity, and lower cost wireless communication protocol, designed for applications requiring lower data rates and shorter duty cycles. Inheriting the protocol stack and star topology of classical Bluetooth, BTLE redefines the physical layer specification, and involves many new features such as a very-low power idle mode, a simple device discovery, and short data packets, etc.

BTLE technology is aimed at devices requiring a low level of power consumption, for example devices that may operate with one or more button cell batteries such as sensors, key fobs, and/or the like. BTLE can also be incorporated into devices such as mobile phones, smart phones, tablet computers, laptop computers, desktop computers etc.

SUMMARY OF EMBODIMENTS

Various aspects of examples of the present disclosure are set out in the claims.

A first aspect of the present disclosure provides a method comprising: a mobile tag receiving at least one first Bluetooth Low Energy message transmitted from each of at least two fixed tags, each first Bluetooth Low Energy message including at least an identifier corresponding to the respective fixed tag; the mobile tag measuring a radio parameter for each of the received first Bluetooth Low Energy messages; and the mobile tag transmitting a second Bluetooth Low Energy message including the identifiers of each of the fixed tags, the measured radio parameters associated with each of the received first Bluetooth Low Energy messages, and an identifier corresponding to the mobile tag, said second Bluetooth Low Energy message enabling the calculation of a position of the mobile tag by a server apparatus.

The radio parameter may be received signal strength.

The method may further comprise the mobile tag receiving at least one first Bluetooth Low Energy message from each of at least three fixed tags.

A second aspect of the present disclosure provides a method comprising: a Bluetooth receiver device receiving at least one second Bluetooth Low Energy message from a mobile tag; the Bluetooth receiver device decoding from the message identifiers of at least two fixed tags from which first Bluetooth Low Energy messages have been transmitted; the Bluetooth receiver device decoding from the message measured radio parameters associated with the first Bluetooth Low Energy messages; the Bluetooth receiver device decoding from the message an identifier corresponding to the mobile tag; server apparatus retrieving position data corresponding to each of the fixed tags using their respective identifiers; and the server apparatus using the position data and the radio parameters included in the second Bluetooth Low Energy message to calculate a position of the mobile tag.

The method may further comprise the server apparatus detecting whether the mobile tag is moving.

The method may further comprise the server apparatus performing position calculation more frequently in response to detecting that the mobile tag transitions to a moving state.

The method may further comprise the server apparatus using first Bluetooth Low Energy messages from a predetermined number of fixed tags from which strongest signals are received for calculating the position of the mobile tag if signals are received from the predetermined number of fixed tags.

The predetermined number may be at least three.

The position data may contain the latitude, longitude and floor number of the respective device.

The radio parameters may be received signal strength.

The method may further comprise the server apparatus calculating the position of more than one mobile tag.

The method may further comprise the server apparatus using the first Bluetooth Low Energy messages from at least two fixed tags with the highest values of the radio parameter for calculating the position of the mobile tag.

The method may further comprise the server apparatus storing the position data corresponding to each of the fixed tags, and their respective identifiers, in a memory device.

The memory device may be a non-volatile memory, preferably a Read Only Memory.

The Bluetooth receiver device may comprise a transceiver device.

The Bluetooth receiver device may have a fixed position.

The Bluetooth receiver device may be capable of communication with the server apparatus via a data link.

The data link may comprise any of: a WiFi connection and a wired connection.

The method may further comprise the server apparatus using the identifier corresponding to each of the fixed tags to retrieve (look up) the position data of each of the fixed tags.

A third aspect of the present disclosure provides a method according to the second aspect of the present disclosure, and further comprising a mobile tag receiving at least one first Bluetooth Low Energy message transmitted from each of at least two fixed tags, each first Bluetooth Low Energy message including at least an identifier corresponding to the respective fixed tag; the mobile tag measuring a radio parameter for each of the received first Bluetooth Low Energy messages; and the mobile tag transmitting the second Bluetooth Low Energy message including the identifiers of each of the at least two fixed tags, the measured radio parameters associated with each of the received first Bluetooth Low Energy messages, and an identifier corresponding to the mobile tag.

A fourth aspect of the present disclosure provides apparatus comprising a mobile tag, the mobile tag comprising at least one processor, at least one memory, and computer-readable code stored on the at least one memory, wherein the computer-readable code when executed controls the at least one processor to perform a method comprising: receiving at least one first Bluetooth Low Energy message transmitted from each of at least two fixed tags, each first Bluetooth Low Energy message including at least an identifier corresponding to the respective fixed tag; measuring a radio parameter for each of the received first Bluetooth Low Energy messages; and transmitting a second Bluetooth Low Energy message including the identifiers of each of the fixed tags, the measured radio parameters associated with each of the received first Bluetooth Low Energy messages, and an identifier corresponding to the mobile tag, said second Bluetooth Low Energy message enabling the calculation of a position of the mobile tag by a server apparatus.

The radio parameter may be received signal strength.

A fifth aspect of the present disclosure provides apparatus comprising a Bluetooth receiver device and a server, each of the Bluetooth receiver device and the server comprising at least one processor, at least one memory, and computer-readable code stored on the at least one memory, wherein the computer-readable code when executed controls the at least one processor to perform a method comprising: the Bluetooth receiver device receiving at least one second Bluetooth Low Energy message from a mobile tag; the Bluetooth receiver device decoding from the message identifiers of at least two fixed tags from which first Bluetooth Low Energy messages have been transmitted; the Bluetooth receiver device decoding from the message measured radio parameters associated with the first Bluetooth Low Energy messages;

the Bluetooth receiver device decoding from the message an identifier corresponding to the mobile tag; the server retrieving position data corresponding to each of the fixed tags using their respective identifiers; and the server using the position data and the radio parameters included in the second Bluetooth Low Energy message to calculate a position of the mobile tag.

The server may be configured to detect whether the mobile tag is moving.

The server may be configured to perform position calculation more frequently if it is detected that the mobile tag has transitioned to a moving state.

The server may be configured to use first Bluetooth Low Energy messages from a predetermined number of fixed tags from which strongest signals are received to calculate the position of the mobile tag if signals are received from the predetermined number of fixed tags.

The predetermined number may be at least three.

The position data may contain the latitude, longitude and floor number of the respective device.

The radio parameters may be received signal strength.

The server may be configured to calculate the position of more than one mobile tag.

The server may be configured to use the first Bluetooth Low Energy messages from at least two fixed tags with the highest values of the radio parameter to calculate the position of the mobile tag.

The server may be configured to store the position data corresponding to each of the fixed tags, and their respective identifiers, in a memory device.

The memory device may be a non-volatile memory, preferably a Read Only Memory.

The Bluetooth receiver device may comprise a transceiver device.

The Bluetooth receiver device may have a fixed position.

The Bluetooth receiver device may be capable of communication with the server apparatus via a data link.

The data link may comprise any of: a WiFi connection and a wired connection.

The server may be configured to use the identifier corresponding to each of the fixed tags to retrieve (look up) the position data of each of the fixed tags.

A sixth aspect of the present disclosure provides apparatus according to the fifth aspect of the present disclosure, and further comprising a mobile tag receiving at least one first Bluetooth Low Energy message transmitted from each of at least two fixed tags, each first Bluetooth Low Energy message including at least an identifier corresponding to the respective fixed tag; the mobile tag measuring a radio parameter for each of the received first Bluetooth Low Energy messages; and the mobile tag transmitting the second Bluetooth Low Energy message including the identifiers of each of the at least two fixed tags, the measured radio parameters associated with each of the received first Bluetooth Low Energy messages, and an identifier corresponding to the mobile tag.

A seventh aspect of the present disclosure provides a computer program comprising computer executable instructions, which, when executed by a mobile tag, causes the mobile tag to perform: receiving at least one first Bluetooth Low Energy message transmitted from each of at least two fixed tags, each first Bluetooth Low Energy message including at least an identifier corresponding to the respective fixed tag; measuring a radio parameter for each of the received first Bluetooth Low Energy messages; and transmitting a second Bluetooth Low Energy message including the identifiers of each of the fixed tags, the measured radio parameters associated with each of the received first Bluetooth Low Energy messages, and an identifier corresponding to the mobile tag, said second Bluetooth Low Energy message enabling the calculation of a position of the mobile tag by a server apparatus The radio parameter may be received signal strength.

The computer executable instructions when executed may further cause the mobile tag to receive at least one first Bluetooth Low Energy message from each of at least three fixed tags.

An eighth aspect of the present disclosure provides a computer program comprising computer executable instructions, which, when executed by either a Bluetooth receiver device or a server apparatus, causes either the Bluetooth receiver device or the server apparatus to perform: the Bluetooth receiver device receiving at least one second Bluetooth Low Energy message from a mobile tag; the Bluetooth receiver device decoding from the message identifiers of at least two fixed tags from which first Bluetooth Low Energy messages have been transmitted; the Bluetooth receiver device decoding from the message measured radio parameters associated with the first Bluetooth Low Energy messages; the Bluetooth receiver device decoding from the message an identifier corresponding to the mobile tag; the server apparatus retrieving position data corresponding to each of the fixed tags using their respective identifiers; and the server apparatus using the position data and the radio parameters included in the second Bluetooth Low Energy message to calculate a position of the mobile tag.

The computer executable instructions when executed may further cause the server apparatus to detect whether the mobile tag is moving.

The computer executable instructions when executed may further cause the server apparatus to perform position calculation more frequently in response to detecting that the mobile tag transitions to a moving state.

The computer executable instructions when executed may further cause the server apparatus to use first Bluetooth Low Energy messages from a predetermined number of fixed tags from which strongest signals are received for calculating the position of the mobile tag if signals are received from the predetermined number of fixed tags.

The predetermined number may be at least three.

The position data may contain the latitude, longitude and floor number of the respective device.

The radio parameters may be received signal strength.

The computer executable instructions when executed may further cause the server apparatus to calculate the position of more than one mobile tag.

The computer executable instructions when executed may further cause the server apparatus to use the first Bluetooth Low Energy messages from at least two fixed tags with the highest values of the radio parameter for calculating the position of the mobile tag.

The computer executable instructions when executed may further cause the server apparatus to store the position data corresponding to each of the fixed tags, and their respective identifiers, in a memory device.

The memory device may be a non-volatile memory, preferably a Read Only Memory.

The Bluetooth receiver device may comprise a transceiver device.

The Bluetooth receiver device may have a fixed position.

The Bluetooth receiver device may be capable of communication with the server apparatus via a data link.

The data link may comprise any of: a WiFi connection and a wired connection.

The computer executable instructions which when executed may further cause the server apparatus to use the identifier corresponding to each of the fixed tags to retrieve (look up) the position data of each of the fixed tags.

A ninth aspect of the present disclosure provides a non-transitory computer-readable storage medium having stored thereon computer-readable code, which, when executed by computing apparatus causes the computing apparatus to perform a method comprising: a mobile tag receiving at least one first Bluetooth Low Energy message transmitted from each of at least two fixed tags, each first Bluetooth Low Energy message including at least an identifier corresponding to the respective fixed tag;

the mobile tag measuring a radio parameter for each of the received first Bluetooth Low Energy messages; and the mobile tag transmitting a second Bluetooth Low Energy message including the identifiers of each of the fixed tags, the measured radio parameters associated with each of the received first Bluetooth Low Energy messages, and an identifier corresponding to the mobile tag, said second Bluetooth Low Energy message enabling the calculation of a position of the mobile tag by a server apparatus.

A tenth aspect of the present disclosure provides a non-transitory computer-readable storage medium having stored thereon computer-readable code, which, when executed by computing apparatus causes the computing apparatus to perform a method comprising: a Bluetooth receiver device receiving at least one second Bluetooth Low Energy message from a mobile tag; the Bluetooth receiver device decoding from the message identifiers of at least two fixed tags from which first Bluetooth Low Energy messages have been transmitted; the Bluetooth receiver device decoding from the message measured radio parameters associated with the first Bluetooth Low Energy messages; the Bluetooth receiver device decoding from the message an identifier corresponding to the mobile tag; server apparatus retrieving position data corresponding to each of the fixed tags using their respective identifiers; and the server apparatus using the position data and the radio parameters included in the second Bluetooth Low Energy message to calculate a position of the mobile tag.

BRIEF DESCRIPTION OF THE DRAWINGS

For a more complete understanding of example embodiments of the present disclosure, reference is now made to the following descriptions taken in connection with the accompanying drawings in which:

FIG. 1($b$) is a schematic diagram of a composite BTLE message used in embodiments of the present disclosure;

FIGS. 6($b$) and 6($c$) show the exemplary screen rotated;

FIGS. 7($b$) and 7($c$) show the sequential display of the general directions of the two mobile tags;

FIG. 8($b$) is an exemplary screen of a display device indicating the locations of two mobile tags relative to a reference point shown in Polar coordinates according to embodiments of the present disclosure;

FIGS. 9($b$) and 9($c$) show exemplary screens of a display device selectively displaying the coordinates of multiple mobile tags relative to a terminal device according to embodiments of the present disclosure;

DESCRIPTION

Figure 1:
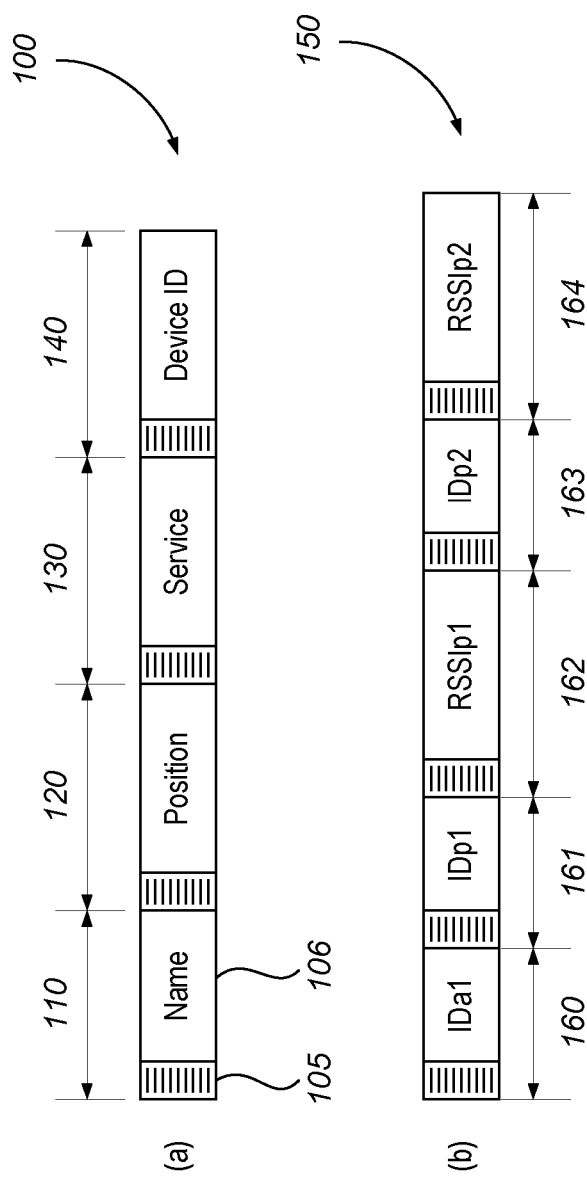
FIG. 1($a$) is a schematic diagram of a BTLE message used in embodiments of the present disclosure.

Bluetooth Low Energy (BTLE) technology has been proposed to be used in indoor positioning systems for tracking devices. Such systems involve the use of High Accuracy Indoor Positioning (HAIP) which places requirements on hardware infrastructure such as the need for multiple array antennas. Therefore this makes for a simpler and more efficient system that is easier to implement using BTLE hardware technology that is already available in the market. The principles of BTLE are described in the art.

BTLE devices broadcast BTLE messages that are associated with profiles, services and protocols as defined by the BTLE standard. Information is transmitted in a BTLE message in a series of AD structures. Each of these AD structures contain a header portion and a payload portion. The header portion describes the type of data present in the payload portion and the size of said data.

An exemplary BTLE message 100 is shown in FIG. 1(a). This BTLE message contains four AD structures: device name 110, device position 120, service 130 and a manufacturer ID 140. Each AD structure has a header portion and a payload portion; the header portion of an AD structure describes the data contained in the payload portion. Such a description may be in the form of the length, size, and/or format of the data in the payload portion. In the example BTLE message shown in FIG. 1(a), AD structure no has a header portion 105 and a payload portion 106. While exemplary BTLE message in FIG. 1(a) shows four AD structures, it will be understood that a BTLE message may contain any number of AD structures. A BTLE message may contain just one AD structure relating to the device ID.

As the BTLE message can be large, the BTLE message need not be received by a receiving device in entirety; the receiving device has the option to stop receiving the rest of a BTLE message once the AD structures containing the required data of the BTLE message have been received by the receiving device.

A BTLE message transmitted by a first BTLE device (a fixed tag 220) is received by a further BTLE device (a mobile tag 210), which measures a radio parameter associated with the BTLE message. Examples of a radio parameter are Received Signal Strength Indicator (RSSI) or the Bit Error Rate (BER). A BTLE message transmitted from a fixed tag 220 contains at least an identifier of the fixed tag.

A further exemplary composite BTLE message 150 is shown in FIG. 1(b). This composite BTLE message is transmitted by a mobile tag 210 which has received BTLE messages from fixed tags 220. Such a composite BTLE message 150 comprises several AD structures 160 to 164 that describes the identifier of the mobile tag as well as identifiers of the fixed tags from which the BTLE messages have been received. The RSSI values associated with each of these BTLE messages are also described by AD structures in the composite BTLE message. Thus in the exemplary composite BTLE message 150 depicted in FIG. 1(b), the AD structure 160 corresponds to the identifier IDa1 of the mobile tag, AD structures 161 and 163 correspond to the identifiers IDp1 and IDp2 of the fixed tags from which BTLE messages have been received, and AD structures 162 and 164 correspond to the RSSI values RSSIp1 and RSSIp2 of the BTLE messages received from the fixed tags, these RSSI values being measured by the mobile tag. FIG. 1(b) depicts a situation in which a mobile tag has received BTLE messages from two fixed tags. However a mobile tag may receive BTLE messages from more than two fixed tags. Accordingly, the length of the composite BTLE message will change depending on the number of fixed tags transmitting BTLE messages to the mobile tag.

Figure 2:
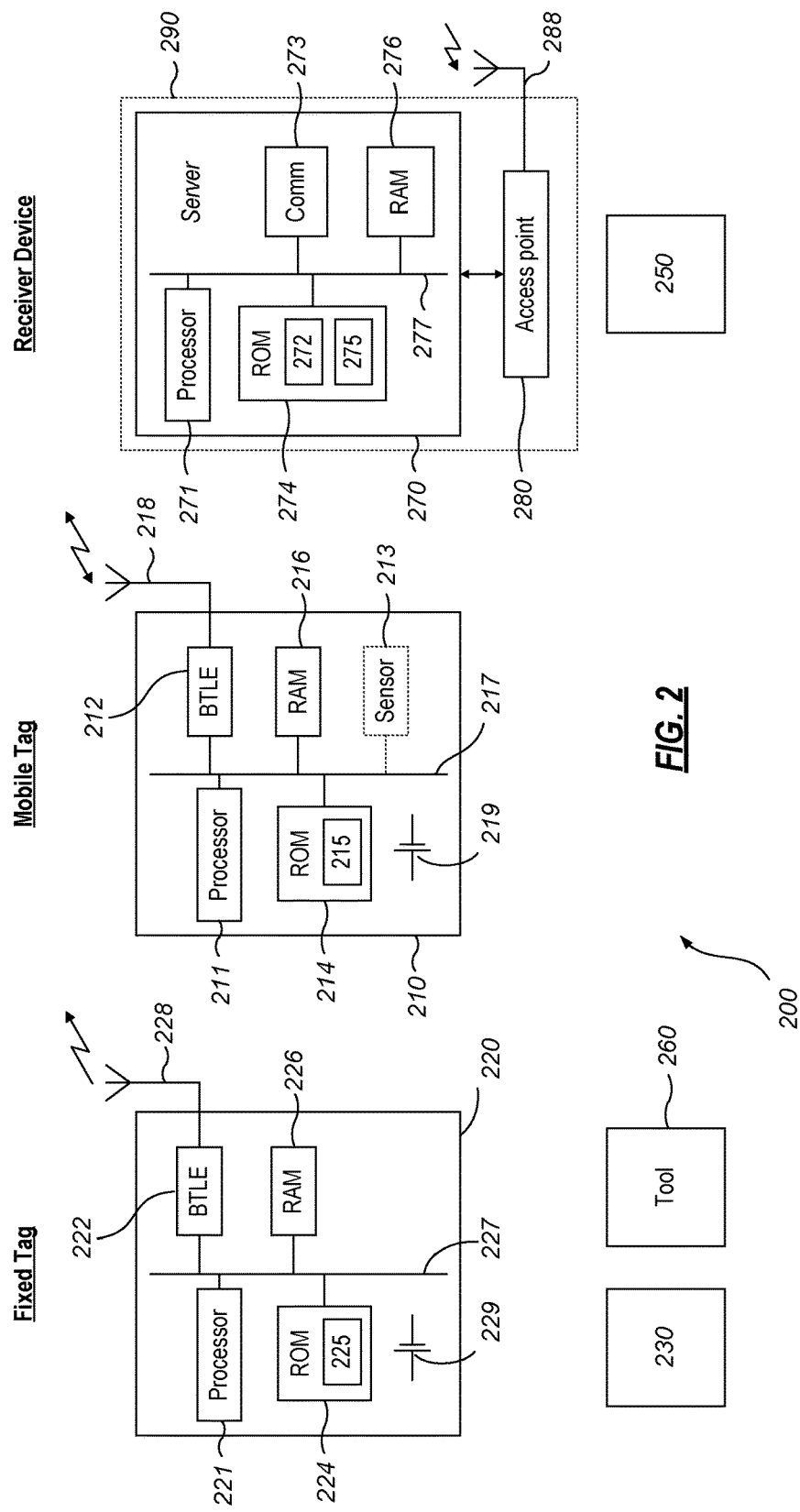
FIG. 2 is a schematic diagram of a system according to aspects of the present disclosure including components according to aspects of the present disclosure and operating according to aspects of the present disclosure.

FIG. 2 shows a system 200 according to embodiments of the present disclosure. The system 200 includes a mobile tag 210, two fixed tags 220 and 230, and a receiver device 290. The mobile tag 210 is portable and its location can be tracked.

The composite BTLE message is transmitted by the mobile tag 210 and is received by the receiver device 290. This receiver device 290 maintains a look up table 275 that relates the identifiers of the fixed tags 220 to the position data associated with each of the fixed tags 220. This position data is pre-stored in the receiver device 290, and will be described in greater detail below. The position data contains data such as the latitude, longitude and floor number associated with the respective fixed tag 220.

With the position data retrieved from the receiver device 290, and the RSSI values associated with each fixed tag 220 contained in the composite BTLE message, the receiver device 290 is able to calculate a locus of the position of the mobile tag 210 relative to the fixed tags 220.

The position of the mobile tag 210 can be better resolved when BTLE messages from more fixed tags 220 are received by the mobile tag 210. This enables the receiver device 290 to calculate a further locus of the position of the mobile tag 210 relative to each additional fixed tag 220. The receiver device 290 then calculates the intersection of these loci to obtain an accurate position of the mobile tag 210 relative to the fixed tags 220.

This calculated position of the mobile tag 210 is then stored in a server 270 of the receiver device 290, which may, in turn, be requested by a terminal device 250 for display of the position of the mobile tag 210.

It will be understood that in order to obtain an accurate calculation of the position of a mobile tag 210 relative to fixed tags 220, at least two of such fixed tags 220 are required. The calculation of the position of a mobile tag 210 is not so accurate if data from only one fixed tag 220 is used.

The receiver device 290 may calculate the locus of the position of the mobile tag 210 relative to the fixed tags 220 using a circle method or a midpoint method.

In the circle method, the RSSI values associated with each of the BTLE messages transmitted from two fixed tags are used to determine radii of two circles, the centres of each being pinned to the location of the respective fixed tag. The locus of the position of the mobile tag relative to the fixed tags is then determined from the area of overlap of these circles.

The midpoint method is a faster method for calculating the position of the mobile tag relative to the fixed tags. This involves using predetermined ratios of RSSI values associated with each BTLE message to calculate intermediate points on lines that join the respective fixed tags. The position of the mobile tag relative to the fixed tags is then determined by calculating the midpoint of the line that connects the intermediate points.

The receiver device may also contain data pertaining to the region which is being mapped, i.e. the region containing the fixed tags and the mobile tags. Such data may identify structures, such as walls, that my further reduce the locus of the position of the mobile tag relative to the fixed tags. Floor plans of the area identifying walls, for example, may be stored in the receiver device; this data is used to further isolate the location of the mobile tag.

It should be noted that while the circle or midpoint methods have been described, other methods of calculating the position of a mobile tag relative to the fixed tags may be used.

The BTLE fixed tags 220 and 230 are based at different locations within a building or complex of buildings and periodically transmit BTLE messages. The BTLE messages transmitted by the fixed tags are advertising messages that include an identifier that is unique to the transmitting device (fixed tag) within the building. Thus, for example, BTLE messages transmitted from fixed tag 220 contains an identifier that is unique to that device. The BTLE messages transmitted by the fixed tags 220 may additionally include position data of the respective fixed tag 220. This position data contains information such as the latitude, longitude and floor number associated with each fixed tag. When the BTLE messages include position data, they are position advertising messages. The BTLE messages transmitted by the fixed tags 220 may alternatively be absent of data indicating the position of the fixed tag 220.

The mobile tag 210 receives BTLE messages transmitted from each of the fixed tags 220 and 230. The mobile tag 210 then measures a radio parameter associated with each received message; this is in the form of an RSSI value, for example. With the identifiers of the fixed tags 220 and 230, and the measured RSSI values associated with BTLE messages received from fixed tags 220 and 230, the mobile tag 210 transmits a composite BTLE message. This composite BTLE message takes the form as depicted in FIG. 1(*b*) and contains the identifier of the mobile tag, identifiers of the fixed tags from which BTLE messages have been received, and the RSSI values of the BTLE messages received from the fixed tags, as described above.

Composite BTLE messages transmitted from the mobile tag 210 are received by a receiver device 290. The receiver device 290 comprises a server 270 and an access point 280. The access point 280 is an example of a Bluetooth Low Energy receiver or transceiver. The composite BTLE message is received by the access point 280 of the receiver device 290. The access point 280 then forwards the data contained in the composite BTLE message to the server 270. The server 270 maintains a look-up table 272 that contains the identifiers of all the fixed tags 220, 230 in the area being mapped, and their respective position data. This position data contains information such as the latitude, longitude and floor number associated with each fixed tag. Thus upon receipt of the identifiers of the fixed tags 220, 230, the server 270 is able to obtain the position data corresponding to the fixed tags 220, 230 that have transmitted BTLE messages to the mobile tag 210. The server 270 does this by querying the look-up table. The RSSI values associated with these BTLE messages have also been transmitted in the composite BTLE message from the mobile tag 210.

Although the receiver device 290 has been described as comprising a server 270, it will be understood that the server may in fact comprise a cluster of servers.

With the position data of the fixed tags 220, 230 and the RSSI values associated with the BTLE messages transmitted by these fixed tags, the server 270 is able to calculate the position of the mobile tag 210 relative to the fixed tags 220, 230 using any of the calculation methods previously described. Generally speaking, the server 270 uses the RSSI values of the BTLE messages received from the fixed tags 220, 230 and the position data obtained from the look-up table to calculate a locus of the position of the mobile tag 210 relative to each of the fixed tags 220, 230. The intersection of the loci obtained from the fixed tags 220, 230 is then calculated by the server 270. This gives an accurate position of the mobile tag 210 relative to each of the fixed tags 220, 230.

Building configuration data may be stored within the server 270. This data may be in the form of floor plans of or map data relating to the area containing the mobile tag 210 and the fixed tags 220, 230. This building configuration data may also be used in the calculations performed by the server 270 to increase the accuracy or confidence of the calculated position of the mobile tag 210.

As mentioned above, this calculated position of the mobile tag 210 is then stored in a server 270 of the receiver device 290 and may be requested by a terminal device 250 for display of the position of the mobile tag 210.

The terminal device 250 is capable of causing display of the position of the mobile tag 210. The terminal device 250 requests position data from the server 270 at a particular frequency. The server 270 then provides the calculated position data relating to the mobile tag 210 to the terminal device 250. The position of the terminal device 250 is known to the terminal device 250 either by calculating it or by receiving it from the server 270 or another server. The terminal device 250 uses the position data relating to the mobile tag 210 and the terminal device 250 to create image data representative of the position of the mobile tag 210 relative to the terminal device 250. The terminal device 250 then uses this image data to cause display of the position of the mobile tag 210 relative to the position of the terminal device 250.

It will be understood that there may be more than one mobile tag 210 present. In this case the terminal device 250 obtains position data relating to the mobile tags 210 that a user is interested in and creates image data representative of the position of each of said mobile tags 210 relative to the terminal device 250. The terminal device 250 then uses this image data to cause display of the position of the mobile tags 210 relative to the position of the terminal device 250.

Referring again to FIG. 2, the mobile tag 210 includes a BTLE module 212, which operates according to the Bluetooth Low Energy standard. Each of the fixed tags 220 and 230 also includes a BTLE module 212 that operates according to the Bluetooth Low Energy standard.

The mobile tag 210 includes a processor 211. The processor 211 is connected to volatile memory such as RAM 216 by a bus 217. The bus 217 also connects the processor 211 and the RAM 216 to non-volatile memory, such as ROM 214. A BTLE module 212 is coupled to the bus 217, and thus also to the processor 211 and the memories 214, 216. An antenna 218 is coupled to the BTLE module 212, although each may instead have its own antenna. Within the ROM 214 is stored a software application 215. The software application 215 in these embodiments is an application for forming the composite BTLE message and appending the mobile tag identifier to said message.

The mobile tag 210 also includes a source of power 219. The source of power 219 may be for instance a battery such as a coin cell. The source of power 219 powers the BTLE module 212 and any other components of the mobile tag 210. The mobile tag 210 may optionally include a sensor 213 for detecting movement of the mobile tag 210. The sensor 213 may take the form of a tilt switch, for instance.

The mobile tag 210 may take any suitable form. Generally speaking, the mobile tag 210 may comprise processing circuitry 211, including one or more processors, and a storage device 214, 216, comprising a single memory unit or a plurality of memory units. The storage device 214, 216 may store computer program instructions 215 that, when loaded into the processing circuitry 211, control the operation of the mobile tag 210.

The BTLE module 212 may take any suitable form. Generally speaking, the BTLE module 212 of the mobile tag 210 may comprise processing circuitry, including one or more processors, and a storage device comprising a single memory unit or a plurality of memory units. The storage device may store computer program instructions that, when loaded into the processing circuitry, control the operation of the BTLE module 212.

The BTLE module 212 includes a communication stack that is implemented at least partly in software using processor and memory resources (not shown), all of which are included within the BTLE module 212. The BTLE module 212 is configured, when enabled by the processor 211 running application 215, to measure the RSSI values of the BTLE messages received by the mobile tag and to create a composite BTLE message containing the identifier of the mobile tag, identifiers of the fixed tags from which BTLE messages have been received, and the RSSI values of the BTLE messages received from the fixed tags. The composite BTLE message is then transmitted from the mobile tag 210 via the antenna 218.

The BTLE module 212 of the mobile tag 210 is both a transmitter and a receiver.

Each of the fixed tags 220 and 230 includes a BTLE module 222, an antenna 228, a source of power 229, a processor 221, RAM 226, ROM 224 containing computer readable instructions and a bus 227, which are constituted and connected in any suitable way. The ROM 224 of each of the fixed tags 220 and 230 also stores information 225. The information 225 includes the location of the fixed tag 220 and 230, and a unique identifier. Information 225 may be written to each of the fixed tags 220 and 230 using an external tool 260 connected to each fixed tag 220 and 230 through the BTLE module 222 thereof.

Each of the fixed tags 220 and 230 may take any suitable form. Generally speaking, these devices may comprise processing circuitry, including one or more processors, and a storage device, comprising a single memory unit or a plurality of memory units. The storage device may store computer program instructions that, when loaded into the processing circuitry, control the operation of the fixed tag 220 and 230 (such as the frequency of transmission of BTLE messages).

Each of the fixed tags 220 and 230 may be configured to operate in the same way. However these devices may differ in that the information 225 stored in the ROM 224 includes a different identifier for each of the fixed tags 220 and 230. The identifier of each of the fixed tags 220 and 230 is included in the BTLE messages transmitted from each of the fixed tags 220 and 230.

The source of power 229 may be for instance a battery such as a coin cell. The source of power 229 powers the BTLE module 222 and any other components of each of the fixed tags 220 and 230.

The BTLE module 222 of each of the fixed tags 220 and 230 is a transmitter.

The receiver device 290 comprises the server 270 and the access point 280. The server includes a processor 271. The processor 271 is connected to volatile memory such as RAM 276 by a bus 277. The bus 277 also connects the processor 271 and the RAM 276 to a non-volatile memory, such as ROM 274. A software application 275 is stored within the ROM 274. The software application 275 is an application for looking up the position data corresponding to the respective fixed tags 220 and 230, and calculating the position of the mobile tag 210. The server also has a communication interface 273 connected to the processor 271 via a bus 277.

The communication interface 273 may be configured to allow two-way communication with external devices and/or networks. The communication interface 273 may be configured to communicate wirelessly via one or more of several protocols such as Global System for Mobile Communications (GSM), Code Division Multiple Access (CDMA), Universal Mobile Telecommunications System (UMTS) and IEEE 712.11 (Wi-Fi). Alternatively or additionally, the communication interface 273 may be configured for wired communication with a device or network.

The communication interface 273 sends the calculated position of the mobile tag 210 stored in the server 270 to a terminal device 250 for display of the position of the mobile tag 210 when requested.

The access point 280 is a Bluetooth transceiver and is in communication with the server 270. The transceiver is a discrete device that may be physically located within the Bluetooth range of the mobile tag 210 and is capable of receiving a composite BTLE message from the mobile tag 210. The transceiver is additionally connected to the server 270 by a data link (e.g. a wired Ethernet cable or a WiFi connection). Thus, subsequent to receiving the composite BTLE message from the mobile tag 210, the transceiver forwards the data contained in the composite BTLE message to the server 270.

The access point 280 has an antenna 288 and is configured to receive composite BTLE messages from the mobile tag 210. The access point 280 then forwards the composite BTLE messages to the server 270. Although only one access point 280 is shown coupled to the server 270 in FIG. 2, it should be noted that it is within the scope of the present disclosure that several such access points 280 may be coupled to the same server 270.

As BTLE messages are used to calculate the position of the mobile tag 210, the use of a wired network is not required. Further, as the calculation is done within the server 270, the computing burden on the processor 211 of the mobile tag 210 is significantly reduced, thereby extending the battery life of the power source 219 of any of the tags (such as the mobile tag 210).

BTLE messages may be transmitted by each of the fixed tags 220 and 230 periodically, for instance at 4 Hz (250 millisecond intervals) or at intervals defined by some component within the system. They may alternatively be transmitted on request of some component within the system.

In this specification, the terms 'message' and 'packet' are used interchangeably since they are intrinsically linked.

The server 270 calculates the position of the mobile tag 210 with the same periodicity with which the composite BTLE messages are received from the mobile tag 210. The composite BTLE messages are transmitted by the mobile tag 210 periodically, for example every second. However this periodicity increases if the mobile tag 210 is moving. Motion of the mobile tag 210 is detected by the sensor 213.

Upon receipt of the composite BTLE message from the access point 280, the server 270 uses the identifiers of the fixed tags 220 and 230 contained in the composite BTLE message to retrieve position data relating to the specific fixed tags 220 and 230. This position data is held in a look-up table contained within the ROM 274 of the server 270. Such a look-up table contains at least the identifiers of all fixed tags contained within the area covered by the server 270, and their corresponding position data. The position data may take any form, such as Cartesian coordinates, Polar coordinates, or simply may just associate each fixed tag with its latitude x, longitude y and floor number z. The data contained in the look up table may be pre-programmed into the server ROM 274 by external means. An exemplary look up table is shown in Table 1 which shows position data corresponding to four fixed tags with identifiers IDp1, IDp2, IDp3 and IDp4.

TABLE 1

| Identifier | Latitude | Longitude | Floor No. |
| --- | --- | --- | --- |
| IDp1 | 7.063 | 319.14 | 1 |
| IDp2 | 7.178 | 318.83 | 1 |
| IDp3 | 6.931 | 319.64 | 2 |

TABLE 1-continued

| Identifier | Latitude | Longitude | Floor No. |
|---|---|---|---|
| IDp4 | 6.897 | 319.96 | 1 |
| ... | ... | ... | ... |
| IDpn | x | y | z |

The processor 271 then uses the position data associated with each of the fixed tags 220 and 230 identified in the composite BTLE message, and the respective measured RSSI values, to calculate the position of the mobile tag 210 using the methods as previously described. The processor 271 may optionally incorporate the features of the area covered by the server 270 to further narrow the calculated locus of the position of the mobile tag 210.

If there are more than two fixed tags, detection of motion of the mobile tag 210 using the BTLE messages received from the fixed tags 220, 230 is made, regardless of whether the mobile tag 210 has a motion sensor 213. If the RSSI measurements in all BTLE messages received from the more than two fixed tags 220, 230 are the same or substantially the same at each period except for the messages from one of the more than two fixed tags 220, 230, the mobile tag 210 is determined to be not moving. The difference in message from the one fixed tag of the more than two fixed tags may be due to attenuation of the signal from that fixed tag (due to, for example, a person walking through the path between the fixed tag in question and the mobile tag).

The computer program instructions 215 in the mobile tag 210 may provide the logic and routines that enables the mobile tag 210 to perform the functionality described. The computer program instructions 215 may be pre-programmed into the mobile tag 210.

The processing circuitry 211, 221, 271 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 211, 221, 271 may be termed processing means.

Typically, the BTLE modules 212 and 222 each comprise a processor connected to both volatile memory and non-volatile memory. The computer program is stored in the non-volatile memory and is executed by the processor using the volatile memory for temporary storage of data or data and instructions.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Each BTLE module 212, 222 may be a single integrated circuit. Each may alternatively be provided as a set of integrated circuits (i.e. a chipset). The BTLE modules 212, 222, may alternatively be hardwired, application-specific integrated circuits (ASIC).

The fixed tags 220, 230 are distributed around a building or premises covered by server 270. For instance these devices may be located at various points in a hospital or warehouse so as to provide sufficient coverage of the premises. While the above description details two fixed tags 220, 230, this is a minimum number of fixed tags required and any number of such devices can be employed.

Embodiments of the present disclosure provide a scheme whereby a BTLE mobile tag 210 is located by a terminal device 250, with the aid of at least two fixed tags 220, 230, without the need for a network. The terminal device 250 causes a display of the mobile tag 210 relative to the position of the terminal device 250, so as to inform or guide a user. In relation to the following description, it will be understood that there may be more than one mobile tag 210 present.

The terminal device 250 (shown in FIG. 5) includes a processor 251. The processor 251 is connected to volatile memory such as RAM 256 by a bus 257. The bus 257 also connects the processor 251 and the RAM 256 to a non-volatile memory, such as ROM 254. A communications interface 252 is coupled to the bus 257, and thus also to the processor 251 and the memories 254, 256. A BTLE module 540 is coupled to the bus 257, and thus also to the processor 251 and the memories 254, 256. An antenna 542 is coupled to the BTLE module 540. A software application 255 is stored within the ROM 254. The software application 255 is an application for causing a display of the mobile tag 210 relative to a reference point on display 258, although the display may not be integral to the terminal device 250 and may take some other form.

The terminal device 250 may optionally include a magnetometer 253 for determining the orientation of the terminal device 250 with respect to the magnetic North.

The communication interface 252 may be configured to allow two-way communication with external devices and/or networks. The communication interface 252 may be configured to communicate wirelessly via one or more of several protocols such as Global System for Mobile Communications (GSM), Code Division Multiple Access (CDMA), Universal Mobile Telecommunications System (UMTS) and IEEE 712.11 (Wi-Fi). Alternatively or additionally, the communication interface 252 may be configured for wired communication with a device or network.

The communication interface 252 sends requests to the server 270 for position data relating to specific mobile tags 210 as specified in the request. Upon receipt of such data, the terminal device 250 causes display of the position of the mobiles tag 210.

The terminal device 250 may be a mobile phone, a smart phone, a tablet computer, a laptop computer, a camera, an mp3-player, or equipment integrated within vehicles, etc.

Figure 3:
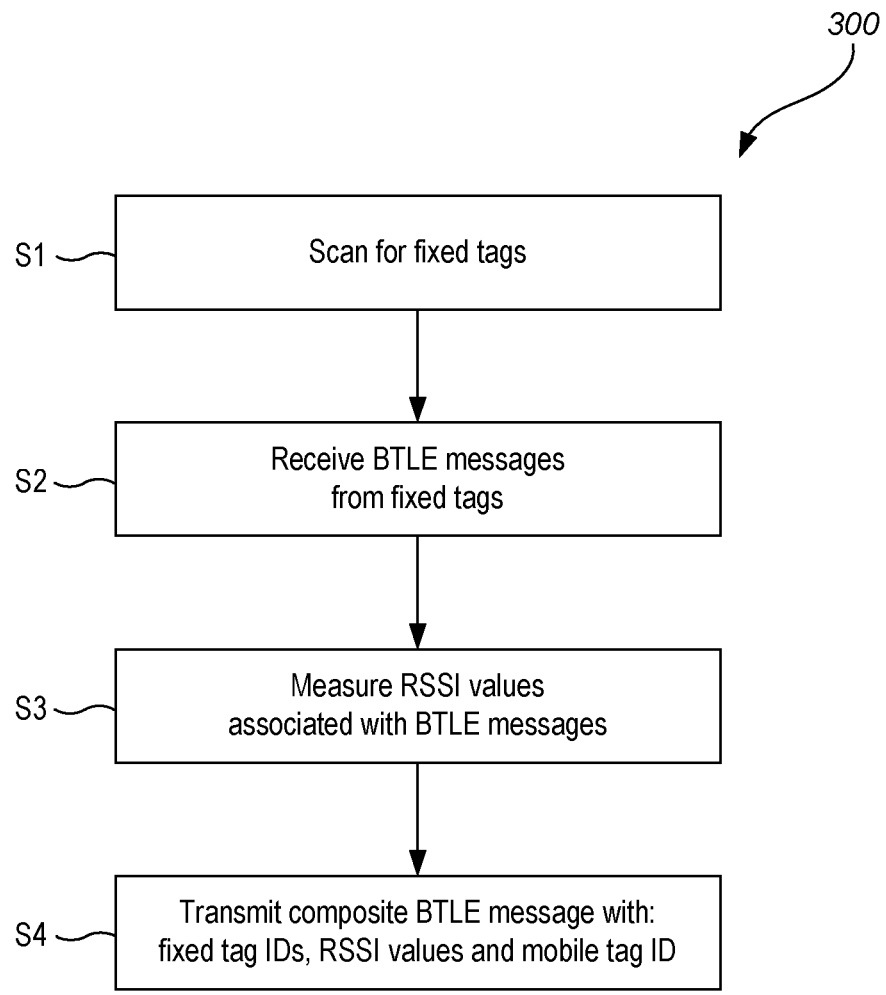
FIG. 3 is a flow chart illustrating operation of a BTLE mobile tag included in the system of FIG. 2 according to embodiments of the present disclosure.

A method 300 according to the present disclosure will now be described with respect to FIG. 3 and mostly with reference to the mobile tag 210. The steps carried out by the mobile tag 210 are performed by the processor 211 using the RAM 216 under control of the software application 215 stored in the ROM 214. Steps performed by the fixed tags 220 and 230 involve the corresponding components.

The operation starts at step S1. Here the mobile tag 210 scans for BTLE messages that are transmitted by any of the fixed tags 220 and 230 as described above. The software application 215 stored in ROM 214 of the mobile tag 210 specifies the manner in which the scanning operation takes place, the frequency of scanning, and the width of the scanning window. Within the scanning window, the processor 211 instructs the BTLE module 212 in the mobile tag 210 to detect BTLE messages that impinge upon the antenna 218.

At step S2, the BTLE module 212 receives BTLE messages that are transmitted by BTLE devices within the scanning window. The processor 112 then determines if the received messages were transmitted by any of the fixed tags 220 and 230. Here the BTLE module 212 in the mobile tag 210 determines the value of an identifier contained in a received BTLE message by checking its header section. The BTLE module 212 then passes this value to the processor 211. The processor 211, using software application 215, compares this value with parameters set by the software application 215. Only BTLE messages transmitted with identifiers that correspond to 'allowed' fixed tags 220 and 230 are received and subsequently stored in the RAM 216.

At step S3, when the processor 211 confirms that a received BTLE message has been transmitted by an 'allowed' fixed tag 220 and 230, it instructs the BTLE module 212 to record a radio parameter associated with said received message. This parameter is the RSSI value. The received BTLE message, the associated RSSI value, and the unique identifier of the fixed tag 220 and 230 from which the message was transmitted are stored in the RAM 216 of the mobile tag 210.

The processor 211 instructs the BTLE module 212 to scan for BTLE messages transmitted from at least three fixed tags 220 and 230.

At step S4, the processor 211 uses the identifiers obtained from the fixed tags 220 and 230, the RSSI values associated with the BTLE messages received from the fixed tags 220 and 230, and the identifier of the mobile tag 210 to create a composite BTLE message. This composite BTLE message takes the form as shown in FIG. 1(b) and is transmitted by the BTLE module 212 of the mobile tag 210 via antenna 218. Transmission of the composite BTLE messages by the BTLE module 212 may be performed at any suitable frequency.

Figure 4:
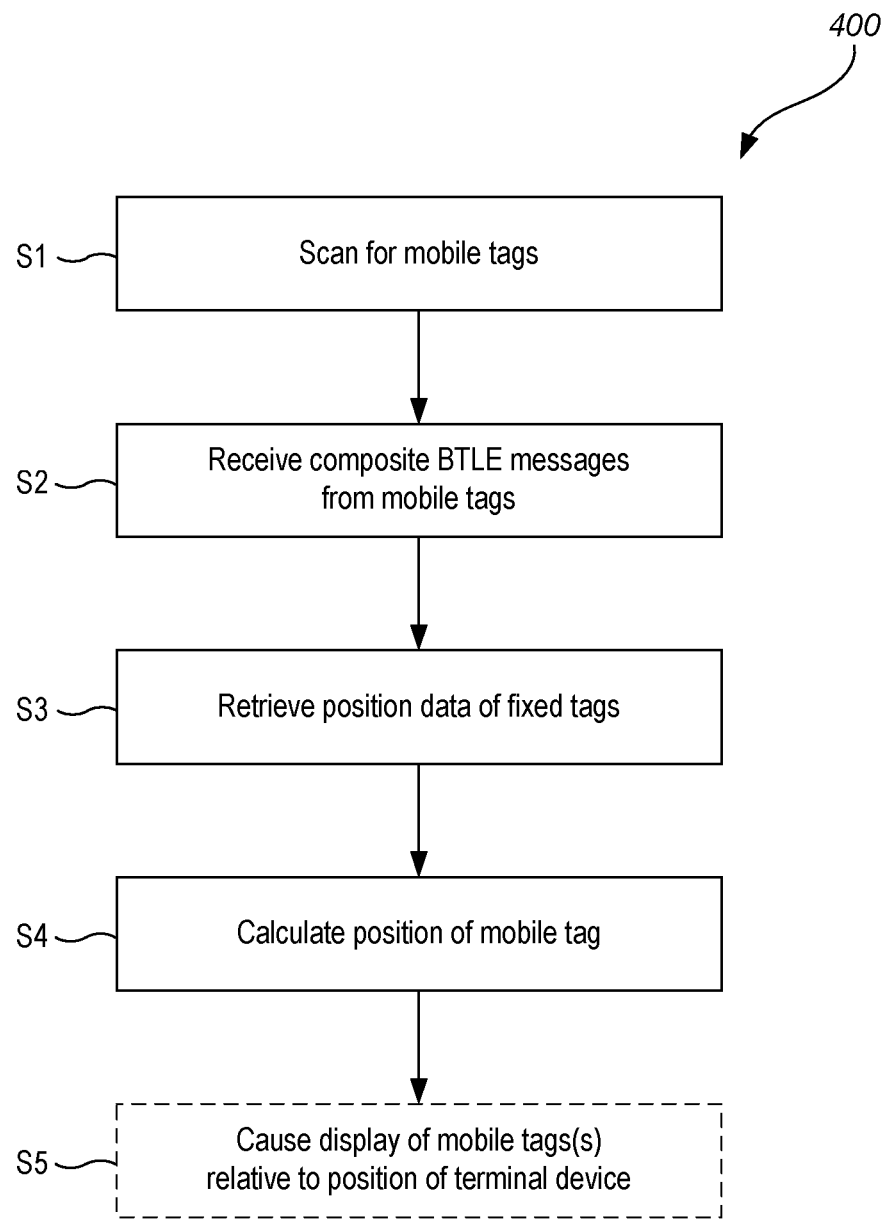
FIG. 4 is a flow chart illustrating operation of a receiving device included in the system of FIG. 2 according to embodiments of the present disclosure.

A second method 400 according to the present disclosure will now be described with respect to FIG. 4, and mostly with reference to the receiver device 290. The steps carried out by the receiver device 290 are performed by the server 270 and the access point 280; in the server 270, the steps are carried out by the processor 271 using the RAM 276 under control of a software application 275 stored in the ROM 274. Steps performed by the mobile tag 210 and by fixed tags 220 and 230 involve the corresponding components.

The method begins at step S1. As with the previously described method, the receiver device 290 scans for BTLE messages that are transmitted by BTLE devices. These devices could be any of the mobile tag 210 and the fixed tags 220 and 230. The software application 275 stored in ROM 274 of the receiver device 290 specifies the manner in which the scanning operation takes place, the frequency of scanning, and the width of the scanning window. Within the scanning window, the processor 271 within the server 270 accesses the access point 280 to detect any BTLE messages that impinge upon the antenna 288.

At step S2, the server 270 receives BTLE messages that are generally transmitted by BTLE devices within the scanning window. The processor 271 then determines the source of the BTLE messages. The processor 271 in the server 270 determines the value of an identifier contained in a received BTLE message by checking its header section. The processor 271, using software application 275, compares this value with parameters set by the software application 275. Only BTLE messages transmitted with identifiers that correspond to 'allowed' BTLE devices are received and subsequently stored in the RAM 276.

The composite BTLE message transmitted by the mobile tag 210 is received by the access point 280 via the antenna 288. This composite BTLE message is then transmitted to the server 270 for action by the processor 271.

At step S3, when the processor 271 confirms that a received BTLE message has been transmitted by an 'allowed' BTLE device (i.e. an allowed mobile tag 210), the processor 271 scans for the identifiers that correspond to the fixed tags 220 and 230 contained in the composite BTLE message. For each identifier, the processor 271 accesses the look-up table stored within the ROM 274 to obtain the position data associated with the fixed tag to which the identifier corresponds. This position data is then momentarily pushed to the RAM 276 of the server 270. If there are identifiers corresponding to more than two fixed tags 220, 230 in the composite BTLE message, the processor 271 then scans for these further fixed tag identifiers, fetches the corresponding position data from the look-up table, and pushes the position data corresponding to these fixed tags to the RAM 276.

At step S4, the processor 271 accesses the RAM 276 and uses the position data contained therein, together with the RSSI values transmitted in the composite BTLE message, to calculate the position of the mobile tag 210. This calculation is performed using the methods described above. If more than two fixed tags are present, the processor 271 only uses the position data in the RAM 276 that corresponds to the three fixed tags that have the highest RSSI values for the calculation step S4.

If there is more than one mobile tag 210 transmitting composite BTLE messages which have been consequently received by access point 280 of the receiver device 290, the processor 271 continues to calculate the position of all the mobile tags 210.

The calculated position of each mobile tag 210, together with the mobile tag identifier, is stored in the RAM 276 of the receiver device 290.

The method then optionally proceeds to step S5. In this step, a terminal device 250 requests for position data corresponding to specific mobile tags 210 from the server 270 for display of the position of the mobile tags 210. This request is made by the communications interface 252 of the terminal device 250 when initiated by a user. The request is a two-step process in which the server 270 is initially queried to ascertain the quantity of position data held within RAM 276. This informs the user of the position data available, and may be presented to the user as a list of mobile tag identifiers. The user then selects the mobile tag(s) as required and a further request is sent to the server 270, this time specifying the identifiers of the mobile tags 210 that the user is interested in. The processor 271 in server 270 then fetches the required position data from the RAM 276 and returns this data to the terminal device 250.

The terminal device 250 then calculates its position in the following manner.

The terminal device 250 scans for BTLE messages that are transmitted by the fixed tags 220 and 230. The software application 255 stored in ROM 254 of the terminal device 250 specifies the manner in which the scanning operation takes place, the frequency of scanning, and the width of the scanning window. Within the scanning window, the processor 251 instructs the BTLE module 540 to detect position advertising messages that impinge upon the antenna 542.

The BTLE module 540 receives messages that are transmitted the fixed tags 220 and 230. The BTLE module 540 in the terminal device 250 determines the value of an identifier contained in a received BTLE message by checking its header section. The BTLE module 540 then passes this value to the processor 251. The processor 251, using software application 255, compares this value with parameters set by the software application 255. Only messages transmitted with identifiers that correspond to 'allowed' BTLE fixed tags are received and subsequently stored in the RAM 256.

Once the processor 251 confirms that a received BTLE message has been transmitted by an 'allowed' BTLE fixed tag, it instructs the BTLE module 540 to record a radio parameter associated with said received message. This radio parameter is the RSSI value of the received message. The received BTLE message, the associated RSSI value, and the unique identifier of the fixed tag from which the message was transmitted are stored in the RAM 256 of the terminal device 250.

While the foregoing description relates to two fixed tags, any number of fixed tags may be present in an area. In general, a at least three fixed tags will be present in an area covered by the server.

The processor 251 uses the location data contained in each of the BTLE messages received from at least three BTLE fixed tags, and the measured RSSI values corresponding to each message, to calculate the location of the terminal device 250 relative to the fixed tags from which the BTLE messages originated.

If there are more than three fixed tags transmitting messages which have been consequently received by the BTLE module 540 of the terminal device 250, the processor 251 may only uses the location data stored in the RAM 256 that corresponds to the three BTLE messages that have the highest RSSI values for the calculation.

The location data corresponding to the position of the terminal device 250 is stored in the RAM 256 of the terminal device 250.

The terminal device 250 then uses the position data transmitted by the server 270 to create image data representative of the position of the mobile tag(s) 210 relative to the terminal device 250. The terminal device 250 then uses this image data, and the location data corresponding to the position of the terminal device 250, to cause display of the position of the mobile tag(s) 210 relative to the position of the terminal device 250.

Figure 5:
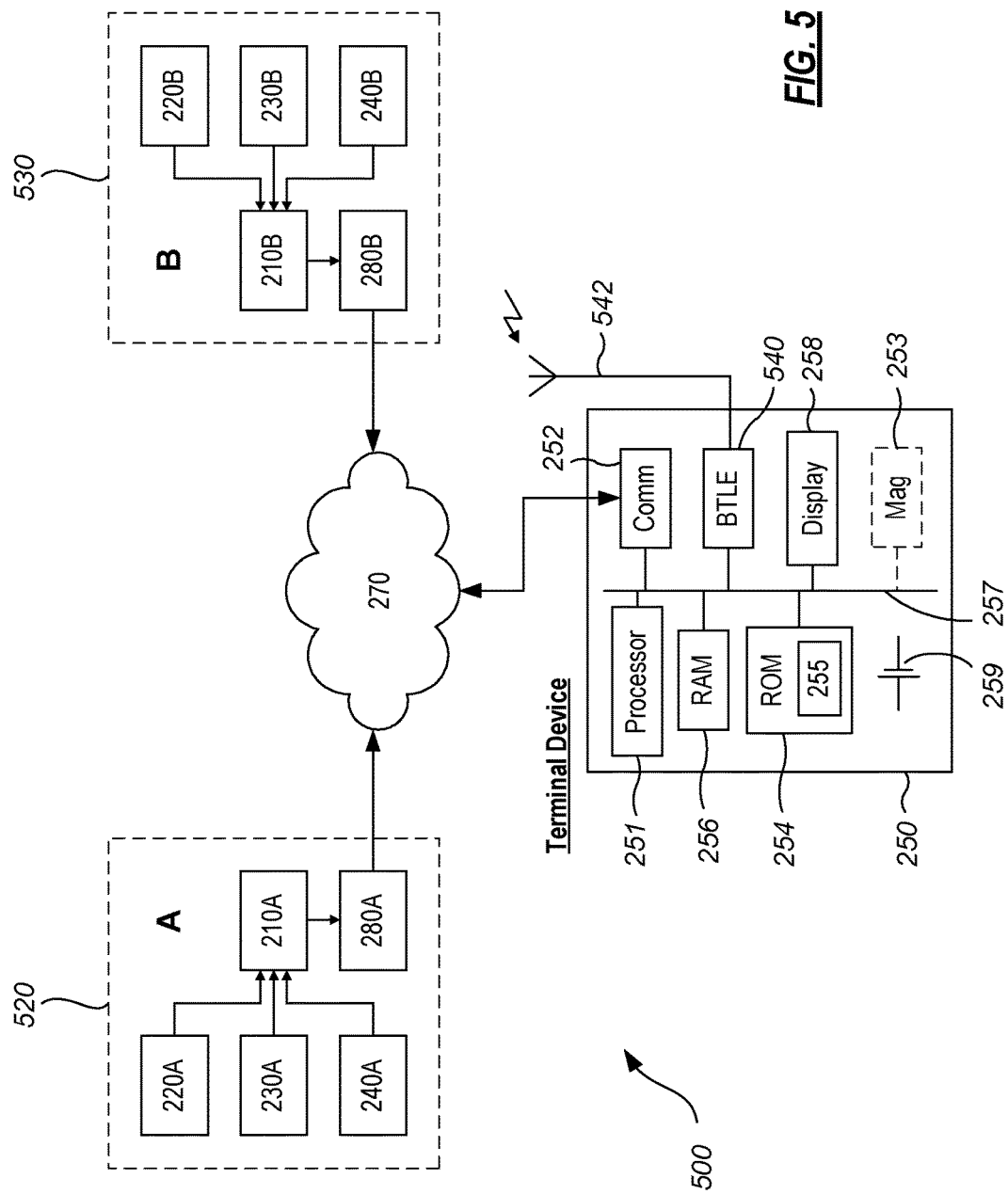
FIG. 5 is a schematic diagram of a terminal device interacting with a server according to aspects of the present disclosure including components according to aspects of the present disclosure and operating according to aspects of the present disclosure.

FIG. 5 shows several areas 520 (zone A) and 530 (zone B), these areas being mapped by a terminal device 250. The terminal device 250 displays the location of one of more mobile tags in each of the areas 520 and 530. The display of the mobile tags in these locations may be done by any method as previously discussed. The server 270 calculates the position of each of mobile tags 210A and 210B relative to the respective fixed tags using the methods as previously described: the position of mobile tag 210A is calculated using data corresponding to fixed tags 220A, 230B and 240C; and the position of mobile tag 210B is calculated using data corresponding to fixed tags 220B, 230B and 240B.

The terminal device 250 displays the position of mobile tag 210A relative to the position of the terminal device 250A in area 520. In addition to this, terminal device 250A may be configured to additionally display the position of mobile tags 210B in area 530.

To do this, the terminal device 250 sends a request for mobile tag data to the server 270. The server queries its RAM 276 and returns a list of mobile tags, the calculated position data of which is presently stored in the RAM 276; this position data is stored in the RAM 276 as position vectors. The user then selects from the list the mobile tag(s) that it wishes to track. The communication interface 252 of the terminal device 250 then sends a request to the server 270 to obtain the position vectors corresponding to a selected list of mobile tags.

The processor 251 uses the data associated with each position vector to enable the display of the mobile tag(s) relative to the position of the terminal device 250. This may be in the form of image data that is output from the processor 251 to a display 258. The image data therefore contains information relating to the location of the terminal device 250 and the relative locations of the mobile tag(s) 210 at that instant. This image data is updated at regular intervals where any new position data corresponding to the position of the mobile tag 210 or the position of the terminal device 250 is re-calculated using the methods described above, and updated image data is then output to the display 258. The software application 255 specifies the frequency with which the updating occurs.

Figure 6:
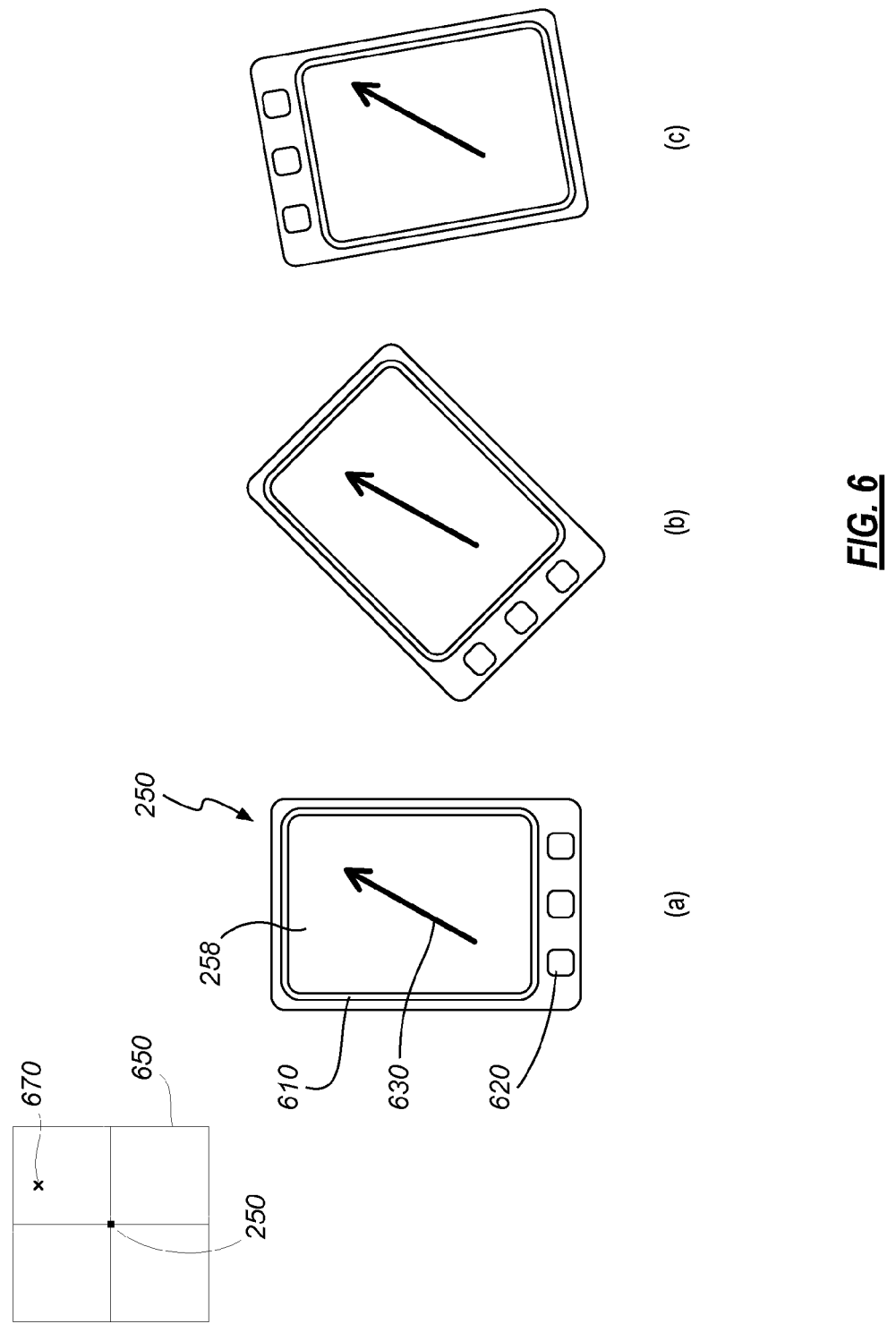
FIG. 6($a$) is an exemplary screen of a display device indicating the general direction of a mobile tag relative to a terminal device according to embodiments of the present disclosure.

FIG. 6(a) shows an exemplary terminal device 250 with a display 258. The terminal device 250 may be a tablet computer, a laptop computer, a smart phone, or equipment integrated within vehicles. The display 258 comprises a screen 610 and a plurality of input buttons 620.

The display 258 is configured to receive the image data generated by the processor 251. The display 258 graphically represents the received image data. This enables a user to view the location of one or more mobile tags 210 relative to the terminal device 250.

This graphical representation may be in the form of an indicated general direction of the mobile tag(s) 210 from the terminal device 250, or specific coordinates from the reference point. These coordinates may be Cartesian coordinates or Polar coordinates.

The simplest form of indication involves the display 258 presenting the user with an arrow 630 to indicate the direction in which a mobile tag 210 is located relative to the terminal device 250, as shown in FIG. 6(a). Here the image data received by the display 258 is representative of an area 650 containing a terminal device 250 and one mobile tag 670. The area 650 is a physical space which contains the mobile tag(s) and the terminal device. The arrow 630 only indicates the direction of the mobile tag 670 in relation the terminal device 250. This graphical representation shows the bearing of the mobile tag 670 from the terminal device 250; no distance is indicated. When the display 258 is rotated (such as in FIGS. 6(b) and 6(c)), the angular placement of the arrow 630 relative to the terminal device 250 does not change. This assumes that the mobile tag 670 has not changed position as the display 258 is rotated as in FIGS. 6(b) and 6(c).

Figure 7:
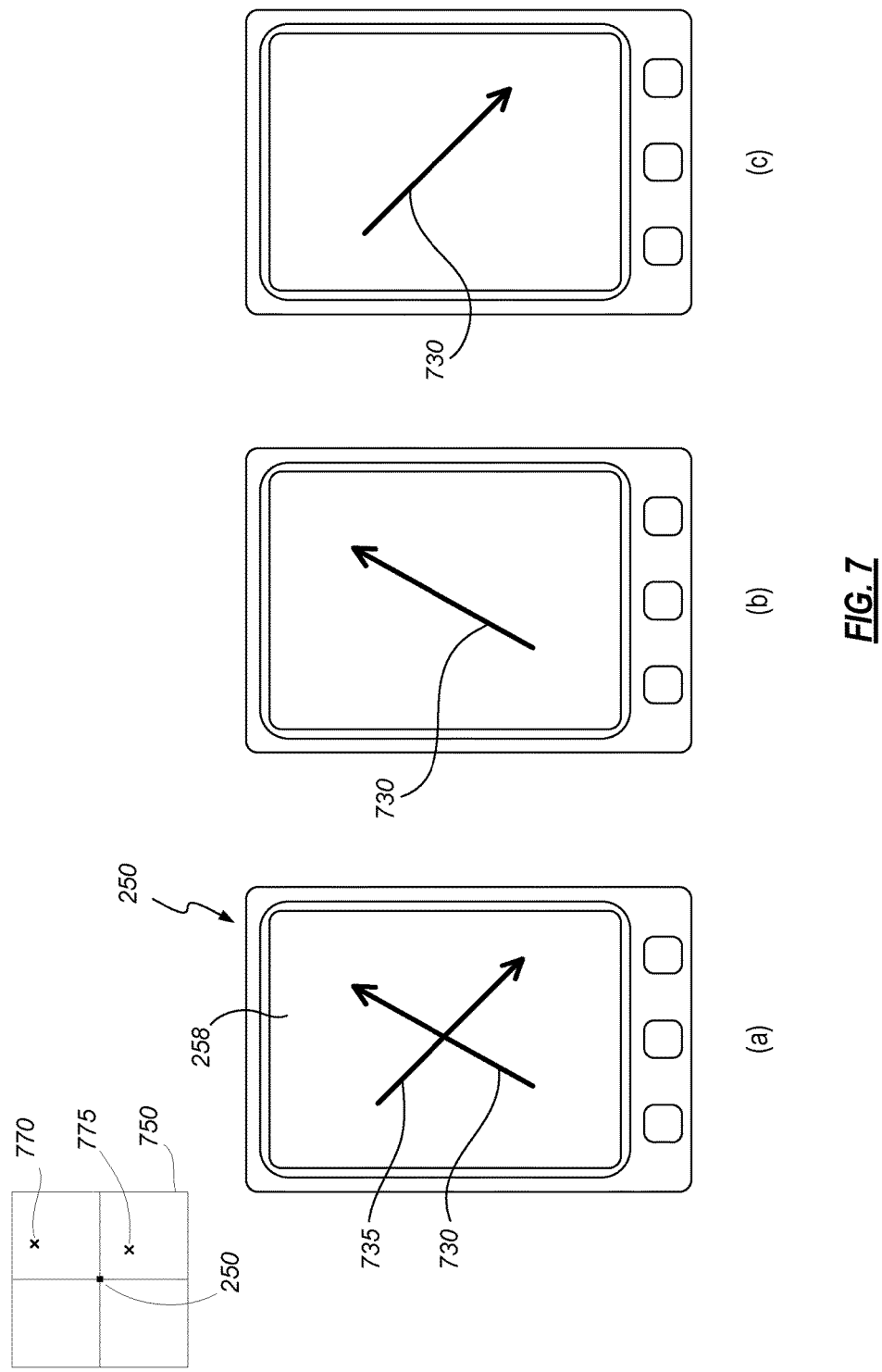
FIG. 7($a$) is an exemplary screen of a display device indicating the general directions of two mobile tags relative to a terminal device according to embodiments of the present disclosure.

If more than one mobile tag is present in the area, the display either displays two arrows on its display, as shown in FIG. 7(a), or plays an animation of a first arrow followed by a second arrow, as shown in FIGS. 7(b) and 7(c). Here the imagining data received by display 258 is representative of area 750 containing a terminal device 250 and two mobile tags 770 and 775. In FIG. 7(a), the display 258 displays two arrows 730 and 735. Arrow 730 indicates the direction of the mobile tag 770 in relation to the terminal device 250, while arrow 735 indicates the direction of the mobile tag 775 in relation to the terminal device 250.

Alternatively, the display may display the two arrows sequentially. This is shown in FIGS. 7(b) and 7(c) in relation to the area 750 as described above. Here display 258 first displays arrow 730, in a first instance, as shown in FIG. 7(b). Arrow 730 indicates the direction of the mobile tag 770 in relation to the terminal device 250. The display 258 then sequentially displays arrow 735, in a second instance, as shown in FIG. 7(c). Arrow 735 indicates the direction of the mobile tag 775 in relation to the terminal device 250.

Figure 8:
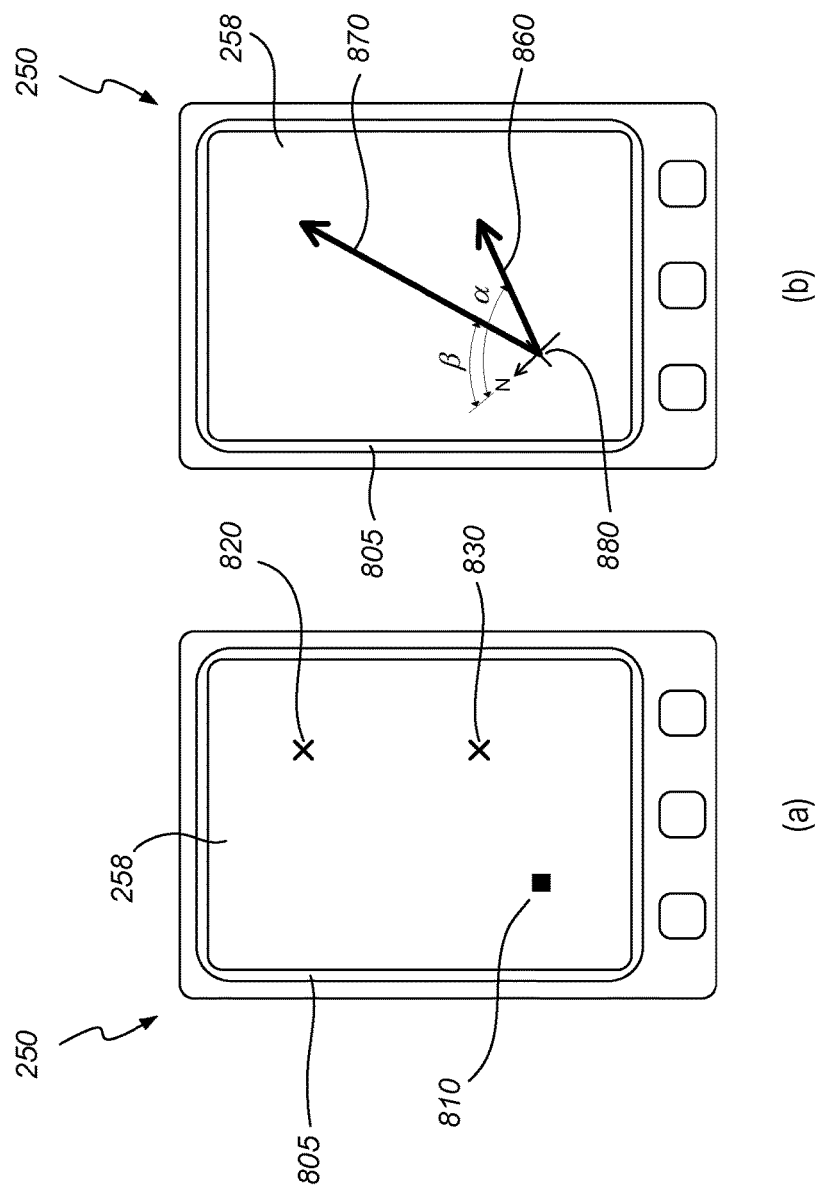
FIG. 8($a$) is an exemplary screen of a display device indicating the coordinates of two mobile tags relative to a terminal device according to embodiments of the present disclosure; points are shown in the Cartesian plane.

The graphical representation on the display could also take the form of specific coordinates. Here both the direction and distance of the mobile tag(s) from the terminal device 250 are indicated on the display 258. FIG. 8(a) shows the display of two mobile tags 210 represented as crosses 820 and 830 and a terminal device 250 represented as a square 810 on a display 258 in a Cartesian coordinate system. In Cartesian coordinates, the latitude and longitude of the mobile tag(s) relative to the terminal device 250 is visually presented on the screen 805 of the display 258. The square 810 indicates the position of the terminal device 250, while the crosses 820 and 830 indicate the relative position of the respective mobile tags 210 with respect to the position of the terminal device 250. A user holding a terminal device 250 is therefore instantly graphically provided with location information of the two mobile tags 210 represented by crosses 820 and 830 in relation to the user's position (i.e. the position of the terminal device 250), thereby enabling the user to find his or her direction within an area.

FIG. 8(b) illustrates a display of the location of two mobile tags 210 represented as arrows 860 and 870, and the location of the terminal device 250 represented as a reference marker 880, on the display 258 in a Polar coordinate system. The reference marker 880 in this case is a compass point indicating North as determined from a magnetometer 253 in the terminal device 250. The compass North is a direction from which all bearings are measured. Thus in this case, the bearing of a mobile tag 210 as indicated by arrow 860 is measured from the compass North, as shown by the angle α. The length of arrow 860 indicates the distance between the terminal device 250 and the mobile tag 210. Similarly, the bearing of a further mobile tag 210 as indicated by arrow 870 is measured from the compass North and is shown by the angle β. The length of arrow 870 indicates the distance between the terminal device 250 and the further mobile tag 210. Therefore, in this particular example, the mobile tag 210 represented by arrow 860 is closer to the terminal 250 than the mobile tag 210 represented by arrow 870, as seen by the respective lengths of arrows 860 and 870.

In various embodiments of the present disclosure, the floorplan of a building may be additionally displayed by the display in relation the previously described display techniques. This floorplan will be of an area of the building within which the BTLE devices are located, and would be within the area covered by the server. The points corresponding to the relative location of the mobile tag(s) are superimposed onto the display of the floorplan. This allows a user having a terminal device 250 to navigate his or her way around the building with ease when tracking a mobile tag 210.

Alternatively, the data relating to the position vectors stored in the RAM 276 of the server 270 could be output to a display 258 of a terminal device 250 which displays this data as text to a user. Such text may present the user with the numerical coordinates of the mobile tag(s) 210 in relation to the position of the terminal device 250.

The information contained in the header portion of each AD structure of the BTLE messages can be used to selectively display position data according to various criteria. These criteria may be based on an identifier value contained in the data packets. In relation to the example provided in FIG. 1(a), the position data may be selected according to the device name, the manufacturer ID or the service, for example. In this manner, the display will only display the position of mobile tags that meet the selection criteria (i.e. mobile tags which have position data that contains the selected identifier value).

Figure 9:
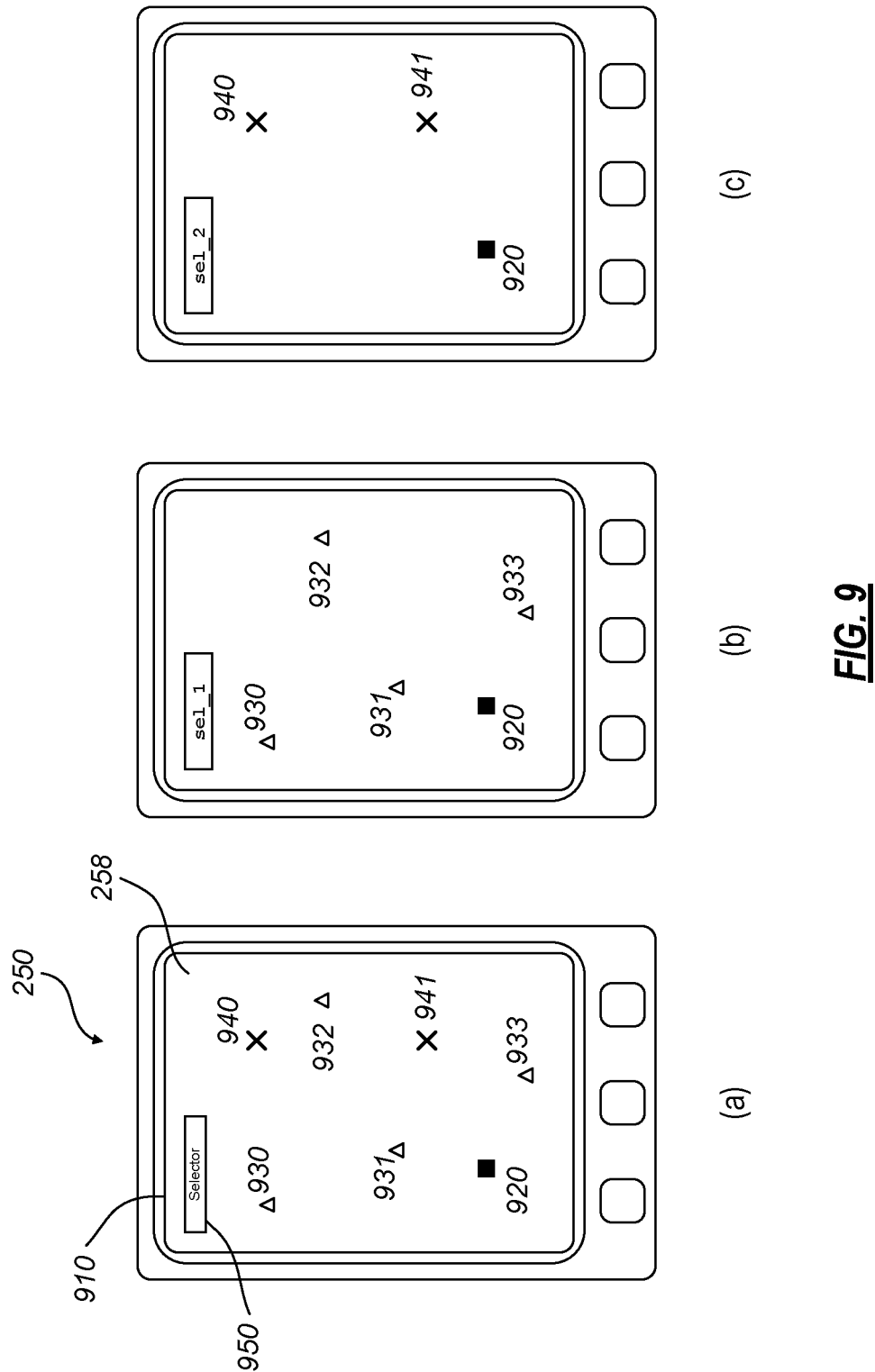
FIG. 9($a$) is an exemplary screen of a display device indicating the coordinates of multiple mobile tags relative to a terminal device according to embodiments of the present disclosure.

FIG. 9(a) illustrates an exemplary display 258 of a terminal device 250. The display 258 comprises at least a screen 910. The screen 910 displays the position of the terminal device 250 as point 920, points corresponding to mobile tags 210 of a first type 930, 931, 932, and 933, and points corresponding to mobile tags of a second type 940 and 941. The first type of mobile tag may have a different identifier value to the second type of mobile tag. For example the first identifier type may be for mobile tags which are attached to patients in a hospital, while the second identifier type may be for mobile tags which are attached to nurses in the same hospital. In the example shown in FIG. 9(a), mobile tags of the first type are shown as triangles, while mobile tags of the second type are shown as crosses. The position of the terminal device 250 is shown as a square.

In FIG. 9(a), the screen 910 also displays a selector menu 950. The selector menu 950 enables the user to display points having identifiers that correspond to a selected value. This alters the display on screen 910 of the display 258. In FIG. 9(b), 'sel_1' has been selected from the selector menu; thus the screen 910 only displays points that correspond to mobile tags 210 that have an identifier value of 'sel_1' in their BTLE messages. These points are the points identified by the triangle icon, and represent mobile tags 210 having the 'sel_1' identifier. To use the above example of a hospital, 'sel_1' could be a value associated with patients.

Conversely, if 'sel_2' has been selected by a user, the screen 910 only displays points that correspond to mobile tags 210 that have an identifier value of 'sel_2'. These points are the points identified by the cross icon, and represent mobile tags 210 having the 'sel_2' identifier in their BTLE messages. To use the above example of a hospital, 'sel_2' could be a value associated with nurses.

A user can therefore filter the displayed position of mobile tags 210 according to their identifiers. This is especially useful when the number of mobile tags 210 is large, which, in turn, clutters a display of the locations of these devices within an area. After filtering the points, the user is able to get a clear idea of the location of mobile tags 210 (having a selected identifier) in relation to the terminal device 250. This may be especially useful for tracking patients or expensive pieces of hospital equipment, for example. As with the examples provided above, a map showing the features of a building or complex within the area may be provided on the screen 810 to enhance the information provided to the user.

Returning back to FIG. 5, mobile tags 210 present in two different areas 520 (zone A) and 530 (zone B) can be displayed together by a single terminal device 250.

Figure 10:
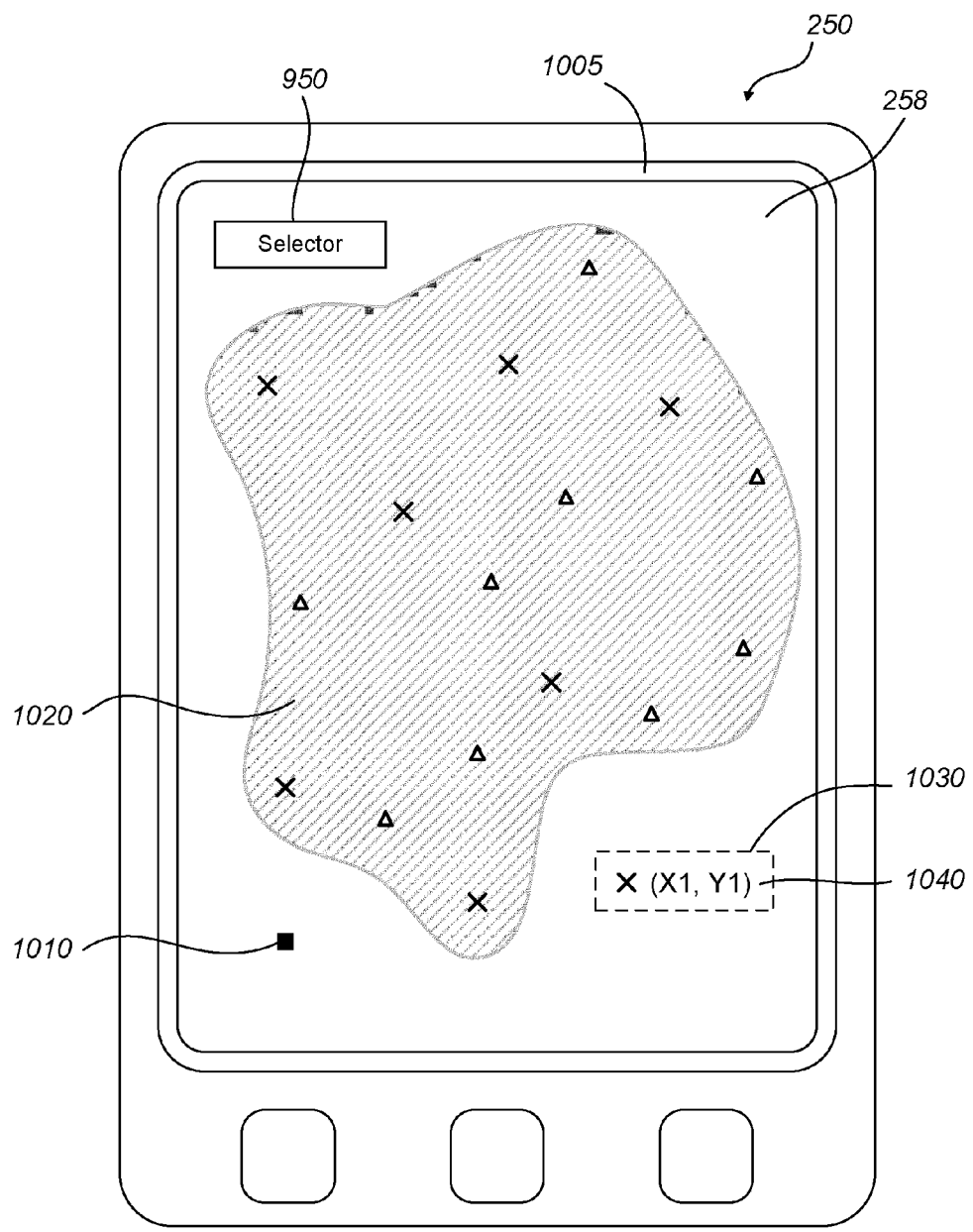
FIG. 10 is an exemplary screen of a display device indicating the coordinates of mobile tags in multiple areas relative to a terminal device according to embodiments of the present disclosure.

FIG. 10 illustrates an exemplary display 258 of terminal device 250. The display 258 comprises at least a screen 1005. The screen 1005 displays the position of the terminal device 250 as point 1010 and points corresponding to mobile tags 210 of a various types, shown collectively as 1020, in an area covered by the server 270 (area 520 (zone A) in FIG. 5). The position of the terminal device 250 is shown as a square. A selector menu 950 is also shown for the purposes as discussed above in relation to FIG. 9(a).

Additionally, the display 258 also shows a section 1030 containing point 1040 which relates to mobile device 210B in an area external to area 520. From FIG. 5, mobile tag 210B is located in area 530 (zone B). The position of this externally located mobile tag is shown as text in FIG. 10, but it will be understood that the positions of these tags may be displayed in accordance with any of the embodiments as discussed in relation to FIGS. 7 and 8. For example, a map of area 530 (zone B) may be shown in an inset in the display 258 to pictorially represent the position of mobile tag 210B in area 530.

Embodiments of the present disclosure may be applied to an augmented reality environment. Here the terminal device 250 may additionally be equipped with a camera which is able to capture images of the area covered by the terminal device 250. The terminal device 250 overlays these images with the position data obtained from the respective mobile tags 210 available in the area. This presents the user with a stream of images as the terminal device 250 is held by the user, the stream of images showing the position of mobile tags 210 in the area. It will be understood that the positions of these tags may be displayed in the augmented reality environment in accordance with any of the embodiments as discussed in relation to FIGS. 6 to 10.

Embodiments of the present disclosure may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present disclosure, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

Figure 11:
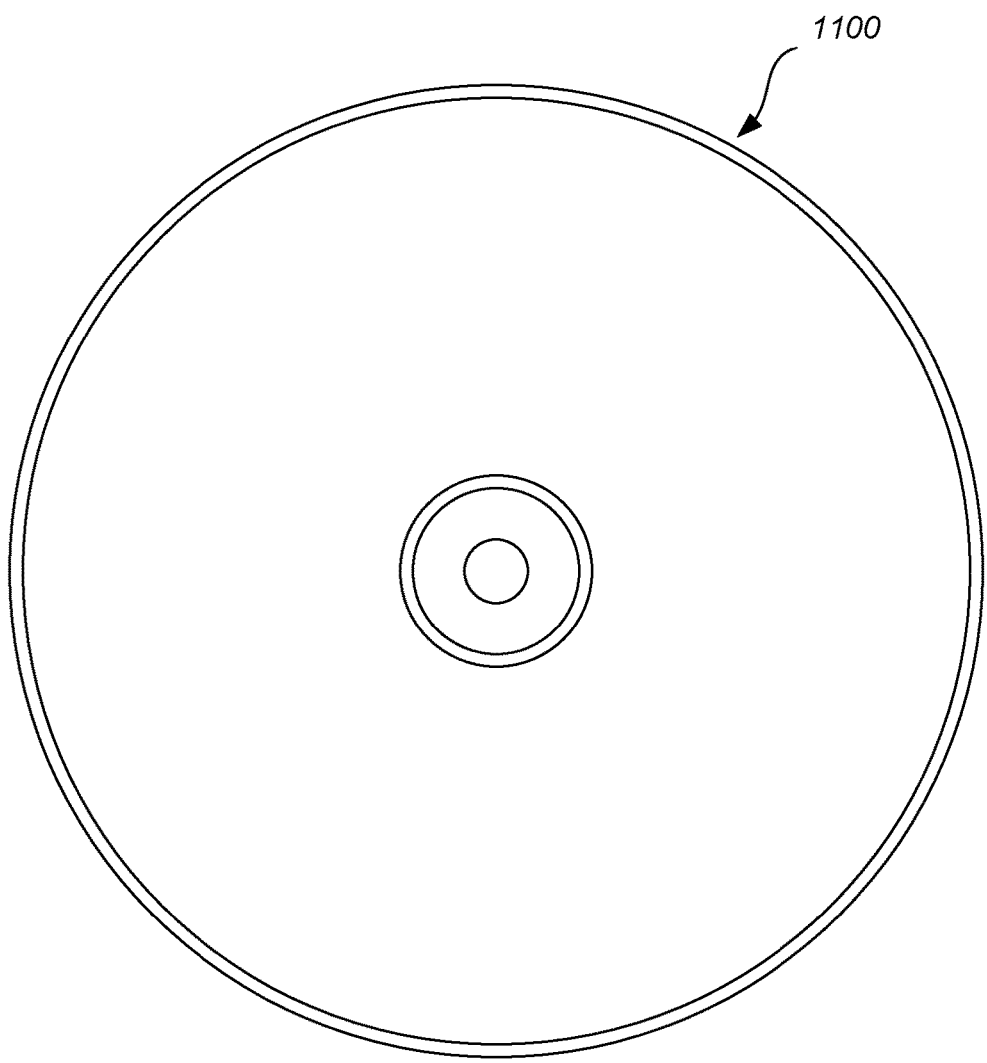
FIG. 11 is an exemplary non-transitory computer readable storage medium according to embodiments of the present disclosure.

By way of example, and not limitation, such "computer-readable storage medium" may mean a non-transitory computer-readable storage medium which may comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. An exemplary non-transitory computer-readable storage medium 1100 is shown in FIG. 11, in the form of an optical storage disk such as a CD. Also, any connection is properly termed a "computer-readable medium". For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that "computer-readable storage medium" and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of "computer-readable medium".

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

If desired, the different steps discussed herein may be performed in a different order and/or concurrently with each other. Furthermore, if desired, one or more of the above-described steps may be optional or may be combined.

Although various aspects of the present disclosure are set out in the independent claims, other aspects of the present disclosure comprise other combinations of features from the described embodiments and/or the dependent claims with the features of the independent claims, and not solely the combinations explicitly set out in the claims.

The invention claimed is:

1. A method comprising:
a mobile tag receiving at least one first Bluetooth Low Energy message transmitted from each of at least two fixed tags, each first Bluetooth Low Energy message including at least an identifier corresponding to the respective fixed tag;
the mobile tag measuring a radio parameter for each of the received first Bluetooth Low Energy messages;
the mobile tag transmitting a second Bluetooth Low Energy message including the identifiers of each of the at least two fixed tags, the measured radio parameters associated with each of the received first Bluetooth Low Energy messages, and an identifier corresponding to the mobile tag;
a Bluetooth receiver device receiving the second Bluetooth Low Energy message from the mobile tag;
the Bluetooth receiver device decoding from the second Bluetooth Low Energy message identifiers of each of the at least two fixed tags from which first Bluetooth Low Energy messages have been transmitted;
the Bluetooth receiver device decoding from the second Bluetooth Low Energy message the measured radio parameters associated with the first Bluetooth Low Energy messages;

the Bluetooth receiver device decoding from the second Bluetooth Low Energy message the identifier corresponding to the mobile tag;

a server apparatus retrieving position data corresponding to each of the fixed tags using their respective identifiers; and the server apparatus using the position data and the radio parameters included in the second Bluetooth Low Energy message to calculate a position of the mobile tag.

2. The method according to claim 1, comprising the server apparatus detecting whether the mobile tag is moving.

3. The method according to claim 1, comprising the server apparatus performing position calculation more frequently in response to detecting that the mobile tag transitions to a moving state.

4. The method according to claim 1, comprising the server apparatus using first Bluetooth Low Energy messages from a predetermined number of fixed tags from which strongest signals are received for calculating the position of the mobile tag if signals are received from the predetermined number of fixed tags.

5. The method according to claim 1, wherein the position data contains the latitude, longitude and floor number of the respective device.

6. The method according to claim 1, wherein said radio parameter is received signal strength.

7. The method according to claim 1, comprising the server apparatus calculating the position of more than one mobile tag.

8. The method according to claim 1, comprising the server apparatus using the first Bluetooth Low Energy messages from at least two fixed tags with the highest values of the radio parameter for calculating the position of the mobile tag.

9. The method according to claim 1, comprising the server apparatus storing the position data corresponding to each of the fixed tags, and their respective identifiers, in a memory device.

10. The method according to claim 1, wherein the Bluetooth receiver device comprises a transceiver device.

11. The method according to claim 1, wherein the Bluetooth receiver device has a fixed position.

12. The method according to claim 1, wherein the Bluetooth receiver device is capable of communication with the server apparatus via a data link.

13. The method according to claim 12, wherein the data link comprises any of: a WiFi connection and a wired connection.

14. The method according to claim 1, comprising the server apparatus using the identifier corresponding to each of the fixed tags to retrieve (look up) the position data of each of the fixed tags.

15. Apparatus comprising a Bluetooth receiver device and server apparatus, each of the Bluetooth receiver device and the server apparatus comprising at least one processor, at least one memory, and computer-readable code stored in the at least one memory, wherein the computer-readable code when executed controls the at least one processor to perform a method comprising:

the Bluetooth receiver device receiving at least one second Bluetooth Low Energy message from a mobile tag;
the Bluetooth receiver device decoding from the message identifiers of at least two fixed tags from which first Bluetooth Low Energy messages have been transmitted;
the Bluetooth receiver device decoding from the message measured radio parameters associated with the first Bluetooth Low Energy messages;
the Bluetooth receiver device decoding from the message an identifier corresponding to the mobile tag;
the server retrieving position data corresponding to each of the fixed tags using their respective identifiers; and
the server using the position data and the radio parameters included in the second Bluetooth Low Energy message to calculate a position of the mobile tag.

16. The apparatus according to claim 15, comprising the server apparatus performing position calculation more frequently in response to detecting that the mobile tag transitions to a moving state.

17. The apparatus according to claim 15, comprising the server apparatus using the first Bluetooth Low Energy messages from at least two fixed tags with the highest values of the radio parameter for calculating the position of the mobile tag.

18. The apparatus according to claim 15, comprising the server apparatus storing the position data corresponding to each of the fixed tags, and their respective identifiers, in a memory device.

19. A method comprising:
receiving at a mobile tag, at least one first Bluetooth Low Energy message transmitted from each of at least two fixed tags, each first Bluetooth Low Energy message including at least an identifier corresponding to the respective fixed tag;
measuring, by the mobile tag, a radio parameter for each of the received first Bluetooth Low Energy messages;
transmitting, by the mobile tag, a second Bluetooth Low Energy message including the identifiers of each of the at least two fixed tags, the measured radio parameters associated with each of the received first Bluetooth Low Energy messages, and an identifier corresponding to the mobile tag;
receiving, at a Bluetooth receiver device, the second Bluetooth Low Energy message from the mobile tag;
decoding, at the Bluetooth receiver, identifiers of each of the at least two fixed tags from which first Bluetooth Low Energy messages have been transmitted from the second Bluetooth Low Energy message;
decoding, at the Bluetooth receiver, the measured radio parameters associated with the first Bluetooth Low Energy messages from the second Bluetooth Low Energy message;
decoding, at the Bluetooth receiver, the identifier corresponding to the mobile tag from the second Bluetooth Low Energy message;
retrieving position data corresponding to each of the fixed tags using their respective identifiers; and
calculating a position of the mobile tag based on the position data and the radio parameters included in the second Bluetooth Low Energy message.

20. A method comprising:
receiving at a Bluetooth receiver, a second Bluetooth Low Energy message from a mobile tag, wherein the second Bluetooth Low Energy message comprises:
identifiers of at least two fixed tags;
measured radio parameters associated with each of the at least two fixed tags; and
an identifier corresponding to the mobile tag;
decoding, at the Bluetooth receiver, the identifiers of the at least two fixed tags from the second Bluetooth Low Energy message;

decoding, at the Bluetooth receiver, the measured radio parameters associated with each of the at least two fixed tags;

decoding, at the Bluetooth receiver, the identifier corresponding to the mobile tag;

providing for retrieval of position data corresponding to each of the fixed tags using their respective identifiers; and providing for calculation of a position of the mobile tag based on the position data of each of the fixed tags and their respective radio parameters included in the second Bluetooth Low Energy message.

* * * * *